United States Patent [19]

Frankenberg et al.

[11] Patent Number: 4,631,020
[45] Date of Patent: Dec. 23, 1986

[54] SEGMENTED BLOW PIN FOR MOLDING MACHINES EMPLOYING REPLACEABLE CUTTING RING

[75] Inventors: Robert E. Frankenberg; Mark A. Calderazzo, both of Orlando, Fla.

[73] Assignee: Sewell Plastics, Inc., Atlanta, Ga.

[21] Appl. No.: 797,928

[22] Filed: Nov. 14, 1985

[51] Int. Cl.⁴ ............................................. B29C 49/58
[52] U.S. Cl. .................................. 425/527; 425/182; 425/535
[58] Field of Search ............... 425/182, 193, 527, 531, 425/525, 535

[56] References Cited

U.S. PATENT DOCUMENTS

| | | | |
|---|---|---|---|
| 3,343,210 | 9/1967 | Guigmard | 425/531 |
| 3,550,200 | 12/1970 | Gilbert | 425/531 |
| 3,597,793 | 8/1971 | Weiler | 425/527 |
| 3,632,264 | 1/1972 | Butcher | 425/531 |
| 3,769,394 | 10/1973 | Latreille | 425/531 |
| 4,173,447 | 11/1979 | Bradbury | 425/527 |
| 4,225,303 | 9/1980 | Crisci | 425/525 |
| 4,234,299 | 11/1980 | Kuenzig et al. | 425/457 |
| 4,390,338 | 6/1983 | Bowers et al. | 425/525 |
| 4,497,623 | 2/1985 | Beuscher | 425/525 |

*Primary Examiner*—Willard E. Hoag
*Attorney, Agent, or Firm*—Duckworth, Allen, Dyer & Pettis

[57] ABSTRACT

A blow pin for molding machines includes first and second separate members juxtaposed adjacent to each other, with a replaceable cutting member positioned between the first and second members and with a shoulder-fastener arrangement associated with the blow tube for holding the first and second members together with the cutting member therebetween.

17 Claims, 3 Drawing Figures

SEGMENTED BLOW PIN FOR MOLDING MACHINES EMPLOYING REPLACEABLE CUTTING RING

BACKGROUND OF THE INVENTION

1. Field of the Invention

The present invention relates generally to molding machinery and methods, and in particular relates to a construction for blow pins for molding machines that utilizes a separable construction employing a replaceable cutting ring.

2. Description of the Prior Art

The term "blow molding" refers to a process widely used to produce bottles from high density resins, such as polyethylene. In the blow molding process, the resin is melted and formed in a viscous, semi-fluid mass. This mass is forced about a mandrel and through an extrusion orifice which shapes the resin into an elongated, thin-walled tube called a "parison." The parison is then positioned around a blow tube and within an opened, two-part mold. After closing of the mold, a blast of air is expelled through that portion of the system known as the "blow pin" to expand the parison to the interior mold wall to form the bottle. The formed bottle is then cooled on the mold walls, and the blow pin is then automatically pulled upwardly. A portion of the blow pin includes a cutting surface which then shears the bottle neck and forms a round hole in the top of the bottle.

Conventional blow pins typically comprise a single, machined unit having an upper portion with an inwardly beveled radius to receive the plastic pushed inwardly by the two mold halves, and terminating at a cutting edge, or shear surface. This single machined blow pin further includes a bottom portion that extends downwardly and receives an internal sleeve having air holes therein, the holes communicating with holes in the blow tube to permit air to be driven outwardly through the blow pin into the parison as described above.

Blow pins of the type described above are relatively expensive machined parts, but must be replaced each time the shear surface becomes dull.

Prior art United States patents of interest include the following: U.S. Pat. No. 4,390,338 to Bowers et al.; U.S. Pat. No. 4,225,303 to Crisci; U.S. Pat. No. 4,234,299 to Kuenzig et al.; and U.S. Pat. No. 4,497,623 to Beuscher.

SUMMARY OF THE INVENTION

The present invention has as its principal purpose the provision for a blow pin assembly and construction for molding machines utilizing a replaceable cutting member.

Blow pin apparatus in accordance with the present invention includes first and second members separable from and juxtaposed adjacent each other, with a replaceable cutting member positioned between the first and second members. Means are provided for holding the first and second members together with the cutting member therebetween.

Preferably, the cutting member comprises a replaceable annular cutting ring defining a cutting edge along an outer peripheral surface thereof.

Further, in accordance with the preferred embodiment of the present invention, the annular cutting ring is supported by first and second shoulders extending from a respective one of the first and second members generally axially with a central passageway of each of the members, which passageway receives the blow tube of the blow molding machine. The shoulders define an area of reduced diameter with respect to the dimension of the outer periphery of the first and second members, to permit the cutting ring to be supported therein.

Each of the first and second members are cylindrical in configuration, the first member extending upwardly along the blow tube from the cutting ring and including a tapered outer surface extending from the cutting ring to permit plastic pressed inwardly from the parison to be received therein and to be trimmed by the cutting edge of the cutting ring during the removal of the blow pin.

The blow pin is further provided with an internal sleeve member extending through the second member and defining an air gap between the sleeve member and the internal wall of the second member, such that air from the blow tube passes through the internal sleeve, along the gap between the sleeve member and the internal surface of the second member, and thence outwardly against the walls of the parison. The internal sleeve also includes a central passageway for receiving the blow tube.

Means, such as a threaded portion of the blow tube and a threaded fastener, are provided to hold the internal sleeve member together with the first and second members and with the cutting ring positioned as described above.

DETAILED DESCRIPTION OF THE PREFERRED EMBODIMENT

Figure 1:
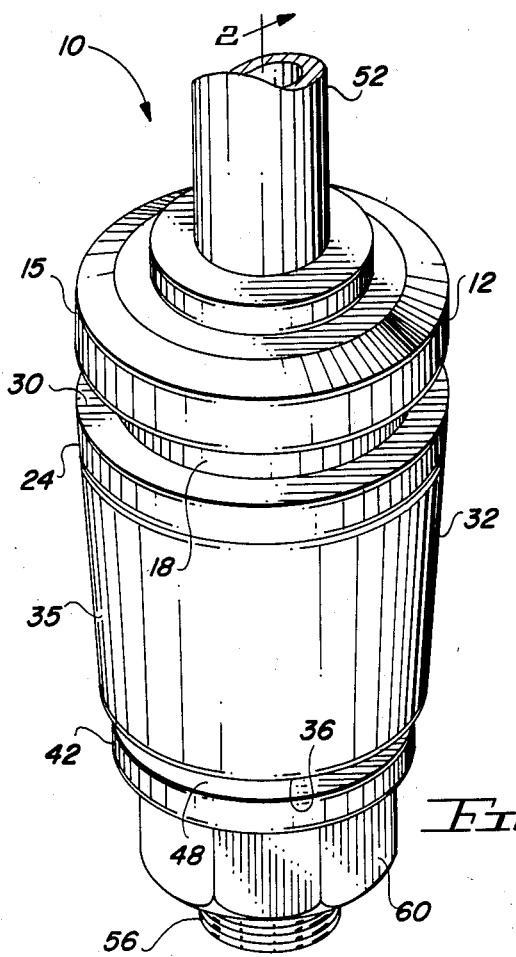
FIG. 1 is a side elevation of a blow tube in accordance with the present invention.
Figure 2:
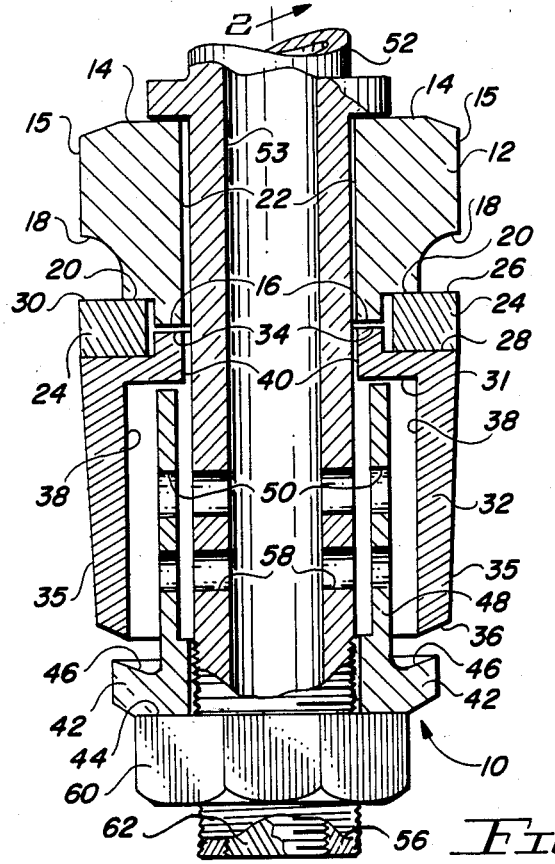
FIG. 2 is a cross-sectional side elevation of a blow tube in accordance with the present invention.

A preferred embodiment of the present invention will now be described with reference to FIGS. 1, 2 and 3.

Reference numeral 10 refers generally to the blow tube assembly in accordance with the present invention, as mounted on a blow tube 52 having an internal passageway 53 and held in place by a fastener, such as hex jam nut 60, threaded on the threads 56 of the lower end of the blow tube.

The blow pin assembly 10 includes a first, upper cylindrical member 12 having an upper surface 14 and a central passageway 22, with a shoulder 16 extending generally downwardly and axial to the central passageway 22. The first member 12 includes a stepped inner surface 20 along the bottom thereof, and a upwardly and outwardly curved surface 18 which receives plastic material pressed inwardly from the extremity of the parison, and which is trimmed by the cutting ring, described in greater detail below, to form the opening of a bottle or other article being molded.

Reference numeral 32 refers to a second, lower cylindrical member having a central passageway 40 and an upwardly extending shoulder 34 also axial with the central passageway 40. The shoulder 34 abuts the shoulder 16 of the first member 12, and together with that first shoulder defines an area of reduced diameter with respect to the outer peripheral dimension of the first and second members 12, 32. This area of reduced wall thickness supports a continuous, annular cutting ring 24 having an upper surface 26 facing the outwardly tapered surface 18, and a peripheral cutting edge 30.

Referring again to the second member 32, that member includes an upper surface 28 upon which rests the cutting ring 24. The outer peripheral surface of the second member 32 tapers slightly inwardly from the lower extremity of the cutting ring to the bottom surface 36 of the second member 32.

The second member 32 includes an outwardly extending surface 31 and a downward internal diameter 38 somewhat larger than the central passageways 22 and 40 through the respective ones of the first and second members 12, 32. This larger internal diameter of the inner surface 38 of the second member 32 permits an internal sleeve member 42 to extend upwardly through the interior of the second member 32, as is shown in FIG. 2. Internal sleeve member 42 includes a lower surface 44 which abuts the fastener 60, and an upwardly and outwardly beveled upper surface 46. The internal sleeve includes an upward cylindrical wall 48 through which holes 50 extend; these holes correspond to holes 58 in the blow tube and permit equalizing air to pass out of the blow pin assembly from the sides of the blow pin along surface 46 of the internal sleeve member 42.

Figure 3:
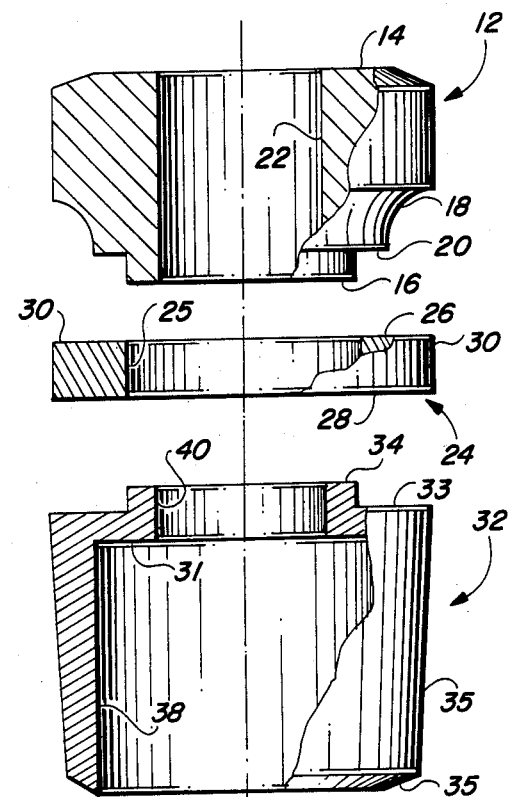
FIG. 3 is an exploded view of portions of the blow tube illustrated in FIGS. 1 and 2.

As is shown more clearly in FIG. 3, the upper extremity 45 of the internal sleeve member 42 extends upwardly and abuts the surface 31 of the second member 32.

A plug 62 is threaded into the bottom of the passageway 53 of the blow tube 52.

In use, the blow pin assembly 10 together with the blow tube 52 is used in the conventional manner to form top openings in molded containers, such as plastic bottles. When the cutting edge 30 of the cutting ring 24 becomes dull, the blow pin may be disassembled by removal of the fastener 58 from the threaded end 56, thereby permitting removal of the internal sleeve member 42 and the second member 32. The cutting ring 24 may then be turned over, exposing the peripheral edge which is along the bottom as shown in FIGURE 2. Alternatively, if both of the cutting edges have been dulled through use, a new cutting ring may be installed.

It is thus seen that the blow pin construction of the present invention offers a facile assembly for permitting the low cost replacement of that portion which wears more quickly than the other portions of the blow pin assembly, thus extending the life of the assembly and reducing the overall cost.

What is claimed is:

1. A blow-pin apparatus for a blow-molding machine, comprising: a blow-tube for introducing fluid into a parison: a first member mounted on said blow-tube; a second member, mounted on said blow tube, separable from said first member and juxtaposed adjacent to said first member; a radially perforated cylindrical sleeve member extending at least partially through said second member; a replaceable cutting member position between said first member and said second member; and means for holding said first and said second members together with said cutting member positioned therebetween.

2. The blow pin apparatus recited in claim 1 wherein said replaceable cutting member comprises an annular cutting ring.

3. The blow pin apparatus recited in claim 2 further comprising one of said first and second members including a shoulder engaging said ring.

4. The blow pin apparatus recited in claim 3 wherein said first member comprises a cylinder having an area of reduced diameter adjacent said cutting ring.

5. The blow pin apparatus recited in claim 4 wherein said second member comprises a cylinder, the outer surface of which tapers inwardly from said cutting ring.

6. The blow pin apparatus recited in claim 5 further comprising:
 means defining an air gap between said sleeve member and the extremity of said second member.

7. The blow pin apparatus recited in claim 5 wherein said air gap means comprises an internal shoulder on said second member, with said sleeve member having a dimension longer than said second member.

8. The blow pin appratus recited in claim 1 wherein said first and second members each include a central passageway for receiving said blow tube therein.

9. The blow pin apparatus recited in claim 8 wherein said means for holding includes a fastener adapted for engaging said blow tube.

10. A blow pin apparatus for a blow-molding machine, comprising:
 A blow-tube for introducing a fluid into a parison; first and second opposed members defining a central passageway for receiving said blow-tube therein, a radially perforated sleeve member extending at least partially through the second of said members about said blow-tube;
 One of said members having a shoulder extending generally axially of said central passageway;
 and a continuous cutting ring between said first and second opposed members, said cutting ring defining a central passageway with said shoulder positioned therein.

11. The blow pin apparatus recited in claim 10 wherein the other of said members further includes a shoulder extending axially with said central passageway, and in abutting relation with the shoulder of one of said first and second members, through said central passageway of said cutting ring.

12. The blow pin apparatus recited in claim 10 further comprising means including a fastener for engaging said blow tube and holding said first and second members together with said cutting ring therebetween.

13. The blow pin apparatus recited in claim 10 wherein said one of said members includes a peripheral area of reduced wall thickness extending to the cutting ring, whereby a cutting edge of said ring is exposed.

14. The blow pin apparatus recited in claim 10 further comprising said blow tube extending through said central Passageway of said first and second members.

15. The blow pin apparatus recited in claim 14 further comprising a shoulder along the other periphery of said blow tube and in engagement with one of said first and second members.

16. The blow pin apparatus recited in claim 15 further comprising a fastener joined to said blow tube for holding said first and second members between said shoulder of said blow tube and said fastener.

17. A blow-pin apparatus for blow-molding machines for making plastic bottles and the like, said apparatus comprising:
 a first, cylindrical, member defining a passageway for said blow-tube therein;
 a second, cylindrical member defining a central passageway for receiving the blow-tube therein; a radially perforated sleeve sized to be positionable within the passageway of said second cylindrical member; said first member having a first shoulder extending generally parallel with surfaces defining said central passageway, along a surface of said member adjacent said second member;

the two shoulders abutting one another and defining a region of reduced wall diameter with respect to other portions of the first and second members; and a continuous cutting ring defining a central passageway corresponding to dimension to the region of reduced wall diameter, said ring having an external cutting edge along the outer periphery thereof Said first, cylindricl member having a second shoulder extending generally parallel with surfaces defining said central passageway along a portion thereof adjacent said first member; the two shoulders abutting one another and defining an area of reduced wall diameter with respect to other portions of said first member and said second member;

a continuous cutting ring defining a central passageway corresponding in dimension to said region of reduced wall diameter, said ring having an external cutting edge along the outer periphery thereof.

* * * * *